United States Patent [19]

Richmond, Jr.

[11] Patent Number: 4,712,308

[45] Date of Patent: Dec. 15, 1987

[54] MEASUREMENT METHOD AND APPARATUS

[76] Inventor: Carleton R. Richmond, Jr., P.O. Box 420, North Scituate, Mass. 02060

[21] Appl. No.: 901,557

[22] Filed: Aug. 29, 1986

[51] Int. Cl.$^4$ .............................................. B43L 7/06
[52] U.S. Cl. ................................ 33/472; 235/61 GM
[58] Field of Search ............ 33/1 C, 1 F, 1 SB, 1 SD, 33/453, 457, 464, 468, 472, 473; 235/61 GM

[56] References Cited

U.S. PATENT DOCUMENTS

| | | | |
|---|---|---|---|
| 364,630 | 6/1887 | Bowyer | 33/457 |
| 986,248 | 3/1911 | Van Duyne | 33/473 |
| 1,553,683 | 9/1925 | Furbish | 235/61 GM |
| 2,309,855 | 2/1943 | Maddox | 33/472 |
| 2,575,328 | 11/1951 | Bardach | 235/61 GM |
| 2,605,960 | 8/1952 | Lores | 33/472 |

Primary Examiner—Richard R. Stearns
Attorney, Agent, or Firm—George E. Kersey

[57] ABSTRACT

Method and apparatus for interpolating elevation values and related locations from data provided on drawings by using an instrument with a supporting scale bar on which are mounted two slides that each has an extension arm. In use, the slides are set at the elevation values of the points on the drawing and one of the slides is moved along the scale bar intersecting a graphic scale at various intervals. The movable arm on the slide intersects the line joining the points on the drawing at various intervals.

5 Claims, 7 Drawing Figures

MEASUREMENT METHOD AND APPARATUS

BACKGROUND OF THE INVENTION

This invention relates to a measurement method and apparatus and, more particularly, to the measurement, interpolation and plotting of elevations of points located on drawings.

In architecture and civil engineering it is routine practice, from known data recorded on drawings, to plot contour lines and to estimate elevation values at specific locations and conversely to estimate locations of specific elevation values.

While there are existing techniques that aid in the interpolation process by using standard mechanical drawing equipmant such as triangles and scaled rulers, the various pieces of equipment used are not coordinated with the process as a whole or with each other. It is common pracice, in each individual case of interpolation, first, to make a mathematical assessment of the whole numbers and fractions that are involved, second, to construct a temporary line on the drawing having the proportional divisions thus determined and, finally, to transfer those divisions to the line for which the interpolation is intended. To do this it is necessary to adopt the temporary line length to the length of the line to be interpolated by forming similar triangles with miscellaneous drafting equipment available.

Accordingly, it is the object of this invention to facilitate direct interpolation between points on a drawing, either isolated or on contour lines.

A related object is to facilitate direct interpolation to determine elevation values at known locations or conversely of locations of known elevation values.

Another object of the invention is to facilitate interpolation between two points by direct readings on, or direct transfer from, standard, graphic, interpolation, scale models.

A related object is to realize an instrument that minimizes the time necessary for the interpolation process.

Another related object is to realize an instrument that minimizes the chances of inaccuracies and errors made during the interpolation process.

A further object of the invention is to render unnecessary a mathematical assessment of the whole numbers and fractions for each individual case of interpolation by substituting therefor a selection chart for, and the combined use of, a bank of standard, graphic, interpolation, scale models.

Still another object of the invention is to render unnecessary the construction of a temporary line appropriately proportioned but of random length for each individual interpolation by substituting therefor an appropriate line from a bank of standard, graphic, interpolation, scale models.

Yet another object of the invention is realizing a pocket size intrument capable of all interpolations between points up to three and a half inches apart.

Another related object is realization of a convenient instrument size by the use of the minimum number of graphic scales achieved by employing them in both a primary and alternate application.

SUMMARY OF THE INVENTION

In accomplishing the foregoing and related objects, the invention provides a method of interpolating elevation values and related locations from data provided on drawings such as isolated point locations and elevation values of isolated points or points on contour lines. The instument consists of a supporting scale bar on which are mounted two slides each carrying an extention arm. In use the slides are set at the elevation-values of the points on the drawing on the appropriate scale carried by the scale bar; the slide arms are set on the points on the drawing; and, finally, one of the slides is moved along the scale bar intersecting the graphic scale at various intervals. Its arm, moving with it, intersects the line joining the points on the drawing at similar, corresponding intervals.

In accordance with one aspect of the invention, its unifying, structural component is a scale bar that bears a bank of standard, graduated scales that relate to elevation values. The scale bar also carries two slides that relate to the various values on these scales. Interpolation between two points on a drawing starts by setting these slides on the elevation values of the points, one on the point with the lower elevation value, the other on the point with the higher value.

In accordance with a further aspect of the invention, each slide carries an outreach arm. After the slides are set on their respective elevation values, the slide that has the arm rigidly mounted is placed on the drawing so that its edge crosses both points and so that the point to which it is to be related is at a reference mark on the edge. The edge of the other arm is then rotated to the necessary angular position to cross the point to which it is to be related. The angular position is maintained as that slide is then moved along the scale causing each position on the scale to be matched by a similar position on the line joining the two points on the drawing.

In addition, the rotatable arm (coordinator arm) is pivoted on a short projection from its slide. The pivot point is set away from the scale bar and the reference edges of both slides in order to provide necessary plotting clearances and clearances for the pivot and the coordinator arm.

In accordance with a still further aspect of the invention the coordinator arm is constructed with a return leg, the inside leg acting as the hypotenuse of a triangle. The other two sides of the triangle are the line joining the two points on the drawing and an imaginary line paralleling the scale bar. Use of the inside edge of the return leg permits use of the outside of the triangle. This makes available an obtuse angle at the intersection of the two slide arms thus providing the necessary clearance for plotting.

In addition, the return leg terminates in a cam that rests on a knife edge located on the slide and in line with the slide reference edge. The cam is held against the knife edge by the spring action of the outreaching arm leg. The cam guides the rigid return leg so that when the outreaching arm rotates about the pivot, the motion of the edge of the return leg simulates rotation about a point in line with both the reference edge of the slide and the imaginary line forming a side of the triangle.

In accordance with a still further aspect of the invention, the scale bar bears a bank of ten, standard, graphic, interpolation scales that represent straight line distributions of various elevation value differences. There is a scale for each possible whole number division between any two value difference. These scales are models for the division of lines between any points on the drawing with a corresponding elevation value difference. The coodinator arm automatically adapts the model to the line length on the drawing.

In accordance with a still further aspect of the invention, a numerical chart is juxtaposed and graphically related to the bank of standard scales. The chart directly indicates the applicable scale for any given elevation values. It consists of a field of higher number, elevation value digits, on one axis related to a list of lower number, elevation value digits and on the other axis to the bank of standard scales.

DESCRIPTION OF THE DRAWINGS

Other aspects of the invention will become apparent after considering several illustrative embodiments taken in conjunction with the drawings in which.

DETAILED DESCRIPTION

Figure 1:
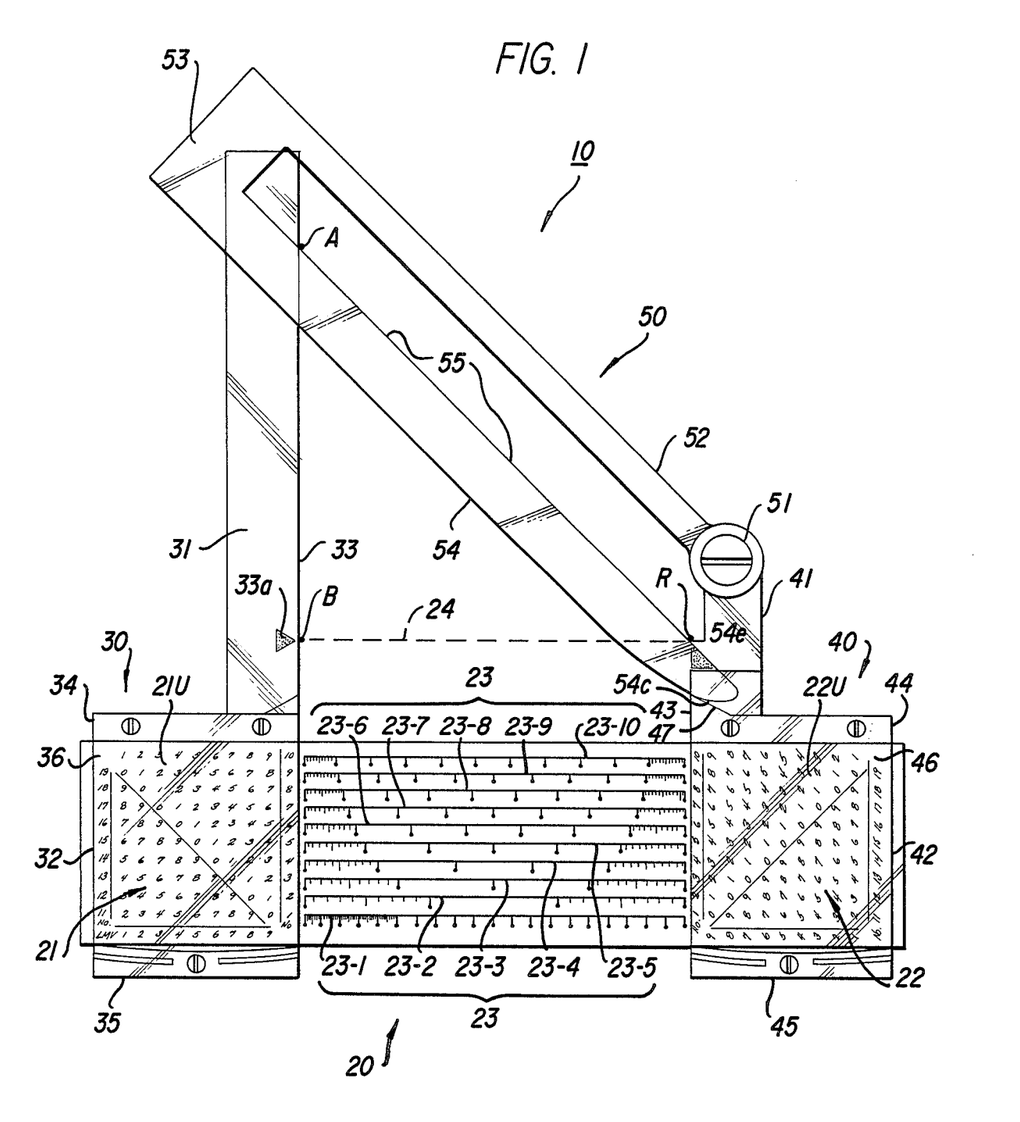
FIG. 1 is a plan view of a plotting device in accordance with the invention.

With reference to the drawings a plotting device 10 in accordance with the invention is shown in FIG. 1 constituted by a scale bar 20 on which is mounted a movable left slide 30 and a movable right slide 40.

The left slide 30 includes an extension 31 from a base 32 with reference edge 33. The base 32 of the left slide 30 has a top guide 34 and a lower spring guide 35. Between the top guide 34 and the spring guide 35 is a viewing window 36 for a chart 21 on the left hand portion of the scale bar 20.

The right slide 40, like the left slide 30, includes a base 42 with a top guide 44 and a spring guide 45. Between the two guides is a viewing window 46 for a chart 22 on the right hand portion of scale bar 20. In addition the base 40 includes an extension 41 that mounts a pivotable coordinator 50 that is used in completing the desired interpolations.

The left slide 30 and the right slide 40 have been spaced apart to provide an unobstructed view of ten graphic sclaes 23-1 through 23-10 in the central portion of the scale bar 20. It will become apparent that in using the plotter 10, the slides 30 and 40 are variously positioned with respect to the scales 23, as explained below.

On the right slide 40, the coordinator 50 is pivotally mounted by a binder post 51 on the extension 41. The binder post 51 illustratively is provided by a screw fitting a collar to control pivoting. Extending from the binder post at pivot 51 is an outgoing leg 52 which reverses at an end 53 and becomes a return leg 54. The return leg 54 is used to provide a hypotenuse reference edge 55, which is not obstructed by the pivot 51.

In use, the plotting device 10, is placed on a drawing or a contour plat so that the reference edge 33 of the extension 31 for the left slide 30 rests on points, illustratively designated A and B, between which interpolations are made.

One of the points, for example B, is positioned at a reference arrow 33a of the reference edge 33. The other point A occupies another position on extension 31

Pressure is maintained on guides 44 and 45 of the left slide 30 while moving scale bar 20 into position under reference edge 33 at an appropriate position on one of the scales 23-1 through 23-10. The procedure for selecting the appropriate scale is explained below. It will be noted that the scales 23-1 through 23-10 are numbered from "1" through "10" in a column between the chart 21 and the scales 23 above a base designation "NO.", an abbreviation for "NUMBER".

Once the scale bar 20 is set relative to the left slide 30, at an appropriate position on one of the scales 23 and reference edge 55 of the coordinator return arm 54 is set on point A. This establishes the proper initial positions of the slide 40 and leg 55 in regard to elevation value and location of point A.

To interpolate between points A and B, the right slide 40 is moved along the scale bar 20, stopping at solid dots on the selected scale to determine whole number interpolations of corresponding points on the drawing. The interpolation positions are at the various intersections of the left slide reference edge 33 and the reference edge 55 of the coordinator return leg 54. The interpolations are noted as the slide 40 is closed towards the slide 30. When the slides 30 and 40 touch, both are at the common origin of the low point B.

One unique feature of the device 10 is the provision of alternate applications of graphic scales 23-1 through 23-10 on the scale bar 20. This allows determination of a scale that permits the most accurate interpolation for specific high and low points. Another feature is the employment of numerical charts 21 or 22 to locate the graphic scale on bar 20 that offers the most advantageous calibrated segments for interpolation between given points, A and B. The slides 30 and 40 are therefore operated with respect to the most advantageous one of ten graphic scales 23 -1 through 23-10.

The coordinator 50 adapts the selected graphic scale to the given line length between points A and B, and enables transfer of the proportions of the scale to the drawing or contour plat.

Each graphic scale 23-1 through 23-10 in the central portion of the scale bar 20 starts with a solid dot that represents a designated whole number value of a given origin or low point, e.g. illustrative low point B. The low point first digit value is followed by a calibrated segment for its decimal fraction and is terminated by a dot representing the first, interpolated, whole number position. Beyond the first point is a segment and dot for each additional interpolation whole number position. Each scale terminates in a calibrated segment that commences with the whole number value of the high point number, e.g. illustrative high point A. The terminal segment represents the fractional increment of the high point value.

The net length of a selected one of the scales 23, therefore, includes (1) the value of the residual decimal fraction before the first whole number interpolation position following the given low point number, (2) the full value of the remaining interpolation positions, including the high point or terminal whole number and (3) the fractional value of the given high point number.

The graphic scales 23-1 through 23-10 provide for any possible interpolation and can be accurate within three places. This is within the practical limits of mapping interpolation because it assumes even ground surfaces with a constant slope whereas uneven surfaces with variable slopes are more usual. The net length of the graphic scales produces a maximum angle of approximately 25° between the coordinator arm and the given line between points A and B when interpolating between values that produce the most advantageous length. The graphic scales 23-1 through 23-10 are symmetrical and unnumbered so that high and low point values can be at either end.

The numerical charts 21 and 22, which are located at opposite ends of the scales 23-1 and 23-10, are used to locate the most desirable scale for a particular interpolation. The given values (A and B) may produce an alternate possibility. When there is an alternate, it offers a longer net length than the first digit indication. The charts, 21 and 22, show the number of interpolation points in columns adjacent to the graphic scales.

Either chart 21 or 22 is used to identify the scale to be used (of the group 23-1 through 23-10) by subtraction of the first place (at the left) digit of the low point value, B. from the first place (at the left) digit of the high point value. Thus, when the remainder is "1", graphic scale 23-1 is indicated. However, if the given low point value has a second place number higher than the corresponding second place number of the given high point value, and is subtracted from it (with a "10" borrowed from the first place digit) the remainder is always 10 or less. Under these circumstances an alternate scale (one of 23-2 through 23-10) can be used with a longer net length than scale 23-1. This alternate is identified by the chart 21 or 22 only when the second place high point number digit is in an unshaded triangular area 21U or 22U. Third place digits do not influence scale selection since they are allocated their own scale segments, regardless of the number of interpolation points.

Conversely, when the difference between the high point and low point values for first place digits is greater than one, the difference between their second place digits must exceed 10, so there is no advantageous alternate scale.

The chart 21 is duplicated in rotated form and becomes chart 22 at the opposite end of the scale bar 20. This is to facilitate use of the instument when it is turned at an angle greater than 45° with respect to the user.

Each of the charts 21 and 22 is also adaptable to rotation by reversing the slides 30 and 40 on the scale bar 20.

As previously noted, the coordinator 50 extends beyond the right slide 40 from a pivot 51. Simulated pivot point R is in line with reference edge 43 of the slide 40. Edge 55 of the coordinator 50 is centered on simulated pivot point R and, during interpolation, is set by the user to intersect the left slide 30 at reference edge 33 on given point A located on extension 31.

The given point B is located at the arrow 33a near the scale bar end of the reference edge 33, so that the left slide 30 reference edge 33 forms the given line for interpolation between points A and B. An imaginary scale line 24, parallel to the graphic scales 23-1 through 23-10, extends between point B and the simulated rotation point R for the coordinator arm edge 55. The result is a triangle, the hypotenuse being the coordinator reference edge 55 and the other two sides being, respectively, the given line (A—B) and the imaginary line 24.

The coordinator 50 of FIG. 1 due to a unique design produces an adjustable angle at the simulated rotation point R of the hypotenuse 55. This is set after the coordinator arm edge 55 is positioned on the given point A and after the scale slide is made to match the net length of the selected one of the graphic scales 23-1 through 23-10. The simulated pivot point R is moved along the imaginary line 24, which has the net length and is parallel to the appropriate graphic scale, while the hypotenuse 55 travels simultaneously downward along the reference edge 33. The positions of the interpolation points on the reference edge 33 are in a similar triangular relationship to the locations of the solid dots of the model scale and can be located accordingly by marking the intersection of the coordinator arm edge 55 with reference edge 33 as the slide 40 travels along the selected one of the scales on the scale bar. When the reference edges of the two slides 30 and 40 are close together, the pivot 51 would obstruct clear access to the interpolation locations on the drawing if it were at point R. This difficulty is overcome by the invention by constructing the coordinator arm 52-53-54 in a U-shape and locating only a simulated, imaginary pivot at point R. This provides for the necessary use and operation of the instument as point R needs clearance as it is on projection 41 at the reference edge 43 of the right slide 40 and on edge 55 of the coordinator arm 50. The hypotenuse 55 is on the return leg 54. The outer edge of the return leg 54 is held against a projection 47 from the right slide 40 by the inherent spring action of the leg 52 with respect to the end at pivot 51. For that purpose the coordinator arm 50 is constructed with a wider spacing in the center of the U-shape at pivot 51.

The knife edge of projection 47 is in line with reference edge 43 of the right slide 40. Thus the hypotenuse 55 on return leg 54 completes the triangle formed with it by edge 33 and imaginary line 24.

Access to marking by the user on edge 33 near pivot 51 would have been restricted, if it were not for the invention, because the pivot in this location would have been an obstruction. To overcome this difficulty, the end 54e of the return leg 54 has the shape of a cam 54c. The cam 54c allows the actual rotation of the coordinator arm 50 to be remotely located and to substitute a simulated rotation point for reference edge 55 at point R. In addition, the cam transfers the reference edge of coordinator arm 50 from the inside of the triangle to the outside at the intersection of the coordinator arm 50 and reference edge 33 of arm 31. As a result there is an obtuse angle at point A and the absence of a tight acute angle results in clear access for marking.

Once the left slide arm 31 is set in place at a prescribed position on the drawing, it remains there throughout the procedure. This is ensured by having the bottom of the base 32 coated with a rough, sharp grained material. Slight pressure on the edges 34 and 35 of the left slide 30 holds it from moving. Once the scale bar 20 is set at the correct fractional decimal value by left slide 30, it remains in place during the marking of interpolation points on the drawing. Both the left slide 30 and the scale bar 20 are held in place by shifting pressure from the edges of the left slide 30 to the center of the slide window.

Figure 2A:
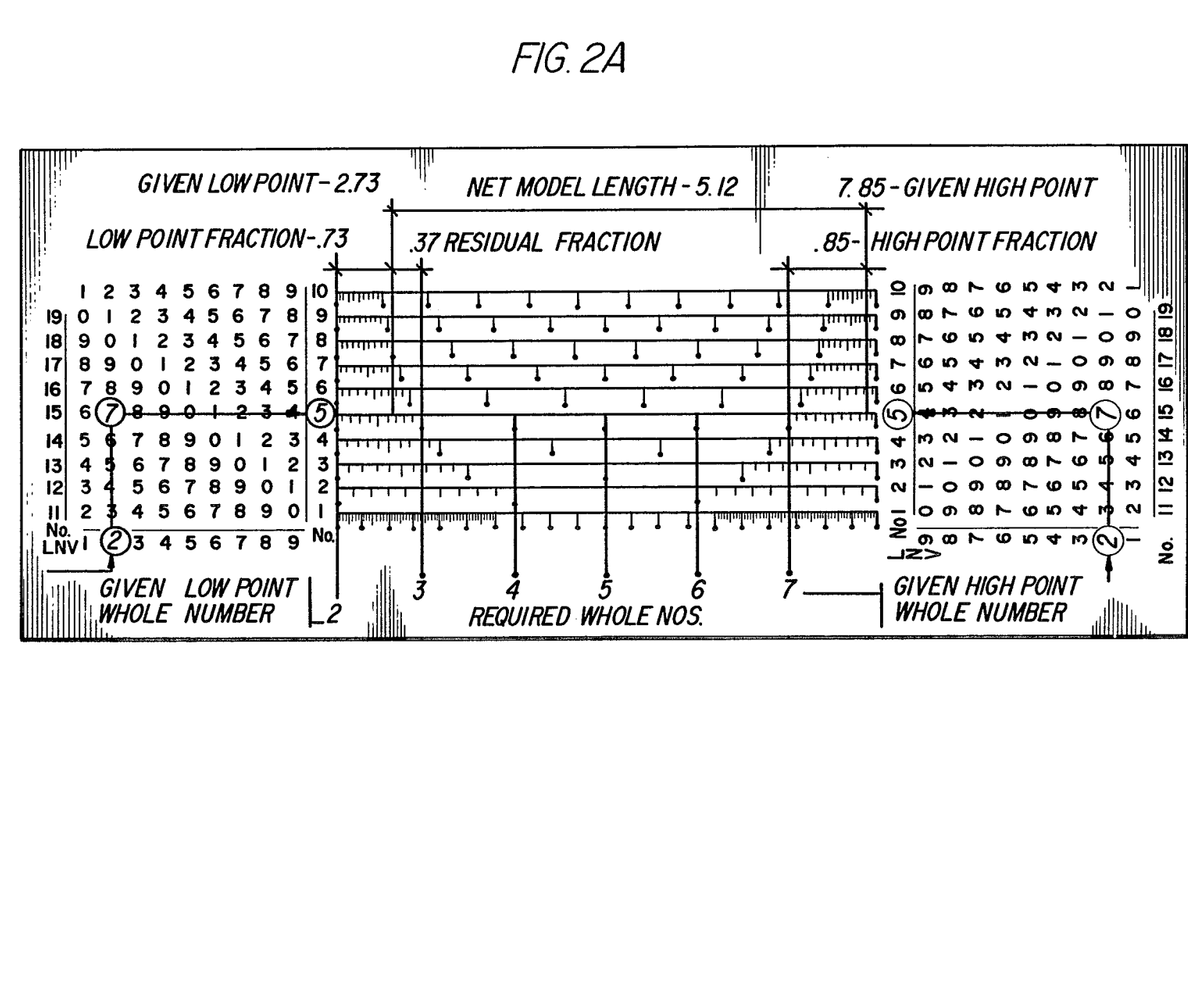
FIG. 2A is an enlarged view of the scale bar of FIG. 1 illustrating the determination of a suitable scale for interpolating between a given low point and a given high point.
Figure 2B:
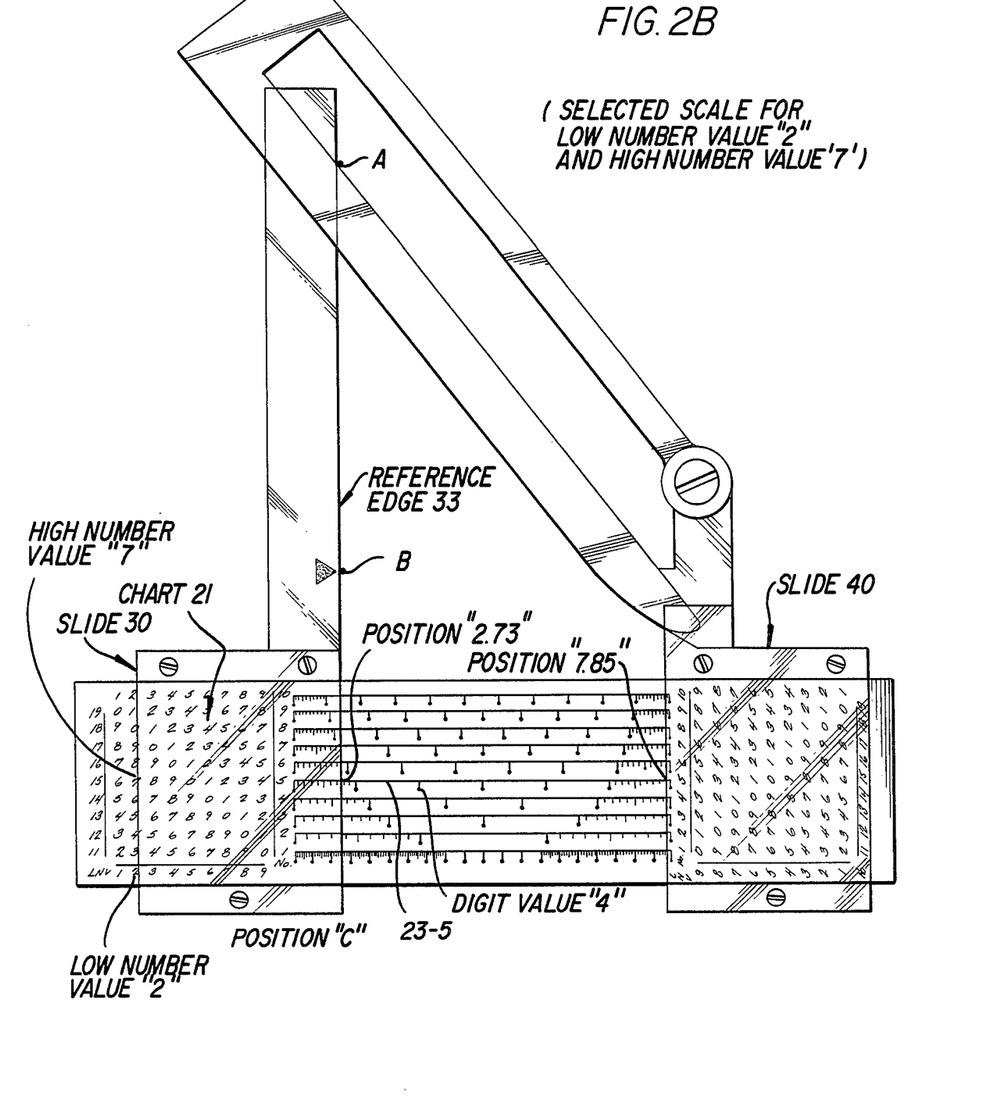
FIG. 2B is a plan view of the plotting device of FIGURE 1 with an initial setting in accordance with FIG. 2A.
Figure 2C:
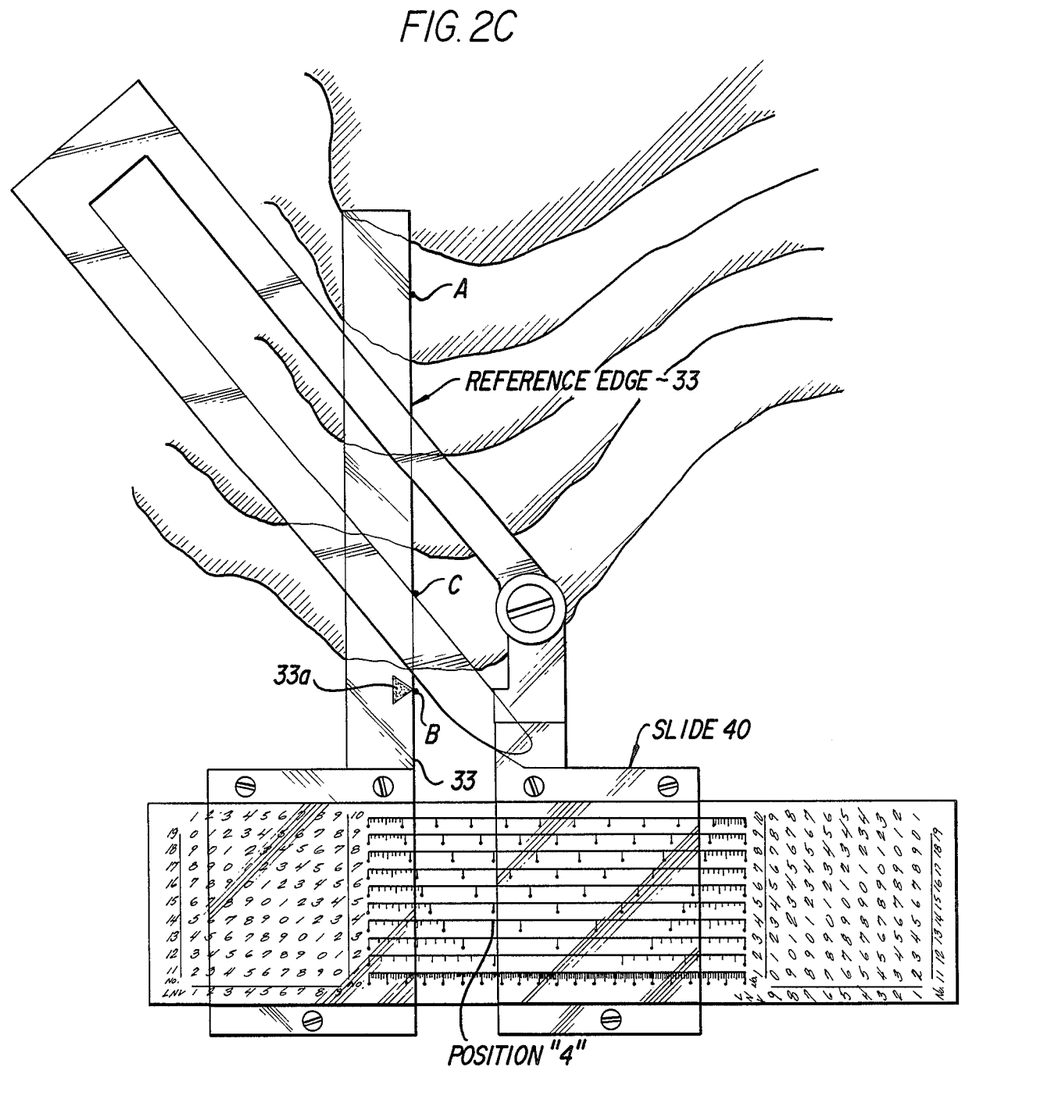
FIG. 2C is a plan view of the plotting device of FIGURE 2B with a setting for determining the second whole number position beyond the given low point.

FIG. 2A illustrates the selection of an appropreate scale for interpolation. Given a low point number of 2.73 and a high point value of 7.85, the whole number of the low point is 2 which permits it to be selected on the left chart 21. Since the high point whole number is 7, it is the fifth scale 23-5 that is designated. This scale ranges between 2 and 8, below the given low point of 2.73 and beyond the given high point of 7.85. A corresponding setting of the slides 30 and 40 is shown in FIG. 2B. A setting of the slide 40 for the interpolation of intermediate value 4.00 is shown in FIG. 2C. The interpolation position is at position C on the reference edge 33. It is apparent that intermediate values between 4.00 and 5.00 can be determined using the subdivided end segments (between 2.00 and 3.00, and between 7.00 and 8.00).

Figure 3:
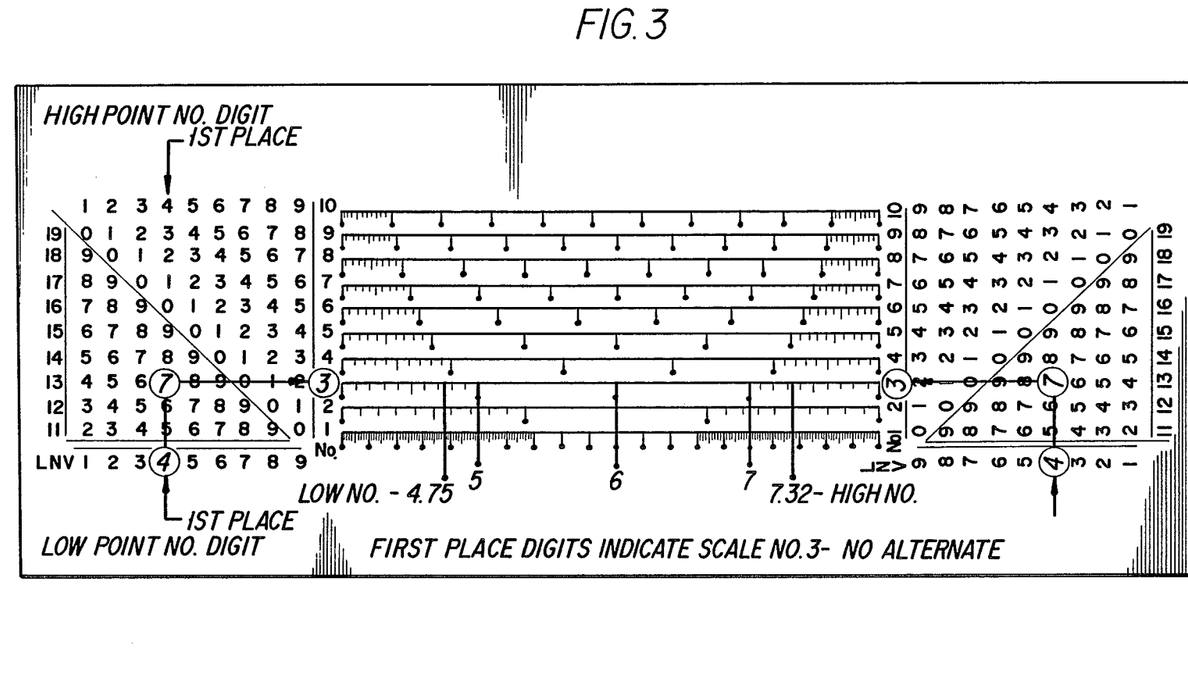
FIG. 3 is a further view of an enlarged scale bar for the device of FIG. 1 indicating the selection of a scale corresponding to a pair of low point and high point numbers in which no alternative scale can be used.
Figure 4:
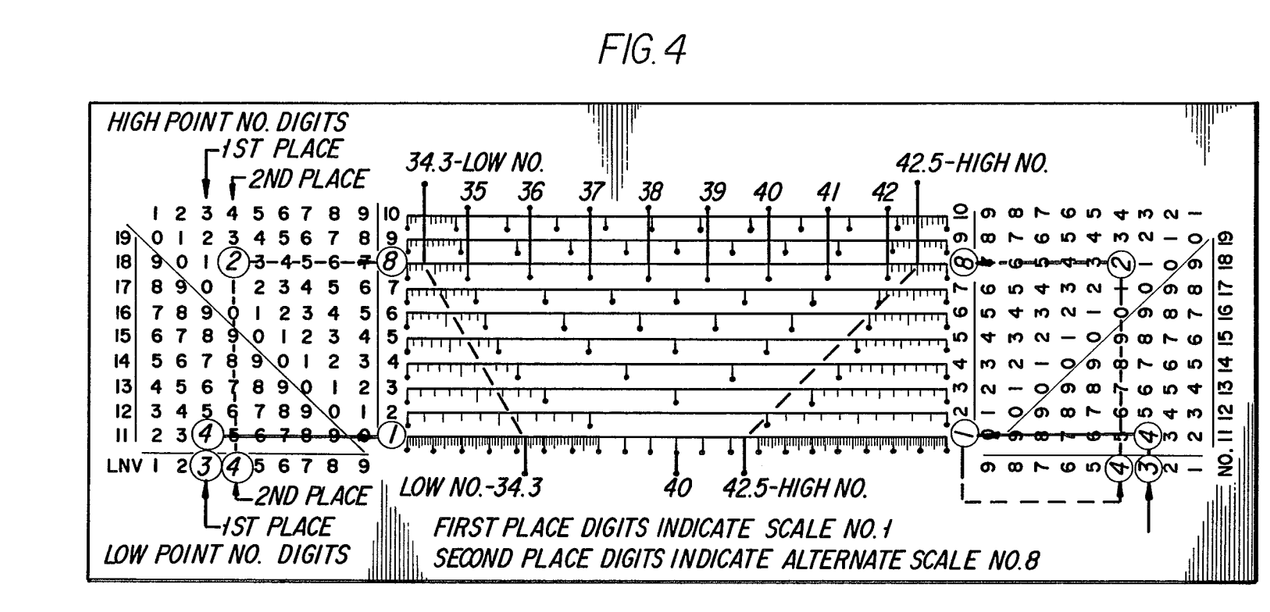
FIG. 4 is a further view of an enlarged scale for the device of FIG. 1 in which the low point and high point digits are such that the first place digits indicate a particular scale but the second place digits indicate the possible use of an alternate scale and FIG. 5 is a further enlargement of a scale bar for the device of FIG. 1 in which the first place digits indicate a particular scale and the second high number digit indicates no alternate.

A further illustration of scale selection is given in FIG. 3. The low point number is illustratively 4.75 and the high point number is 7.32. The first place digit of the low number is 4 which allows a selection of the fourth column on the chart. Since the high point digit is 7 the fourth column is followed until the number 3 is encountered. This selects the third scale. A further illustration is given in FIG. 4. The low point number is 34.3 and the high point number is 42.5. The first place digit in the case of these two numbers are respectively 3 and 4. The first place digits indicate scale number 1. However, the second place digits which are 4 and 2 indicate scale number 8. Accordingly the first scale can be used extending between 34.3 and 42.5. Or the longer scale number 8 can be used extending between 34.3 and 42.5 but with much wider increments between adjoining whole numbers (beyond the decimal). Scale 8 is advantageous because the larger units provide for more accuracy is setting the slide 40 and because the longer scale line reduces the obtuse angle at point A.

Figure 5:
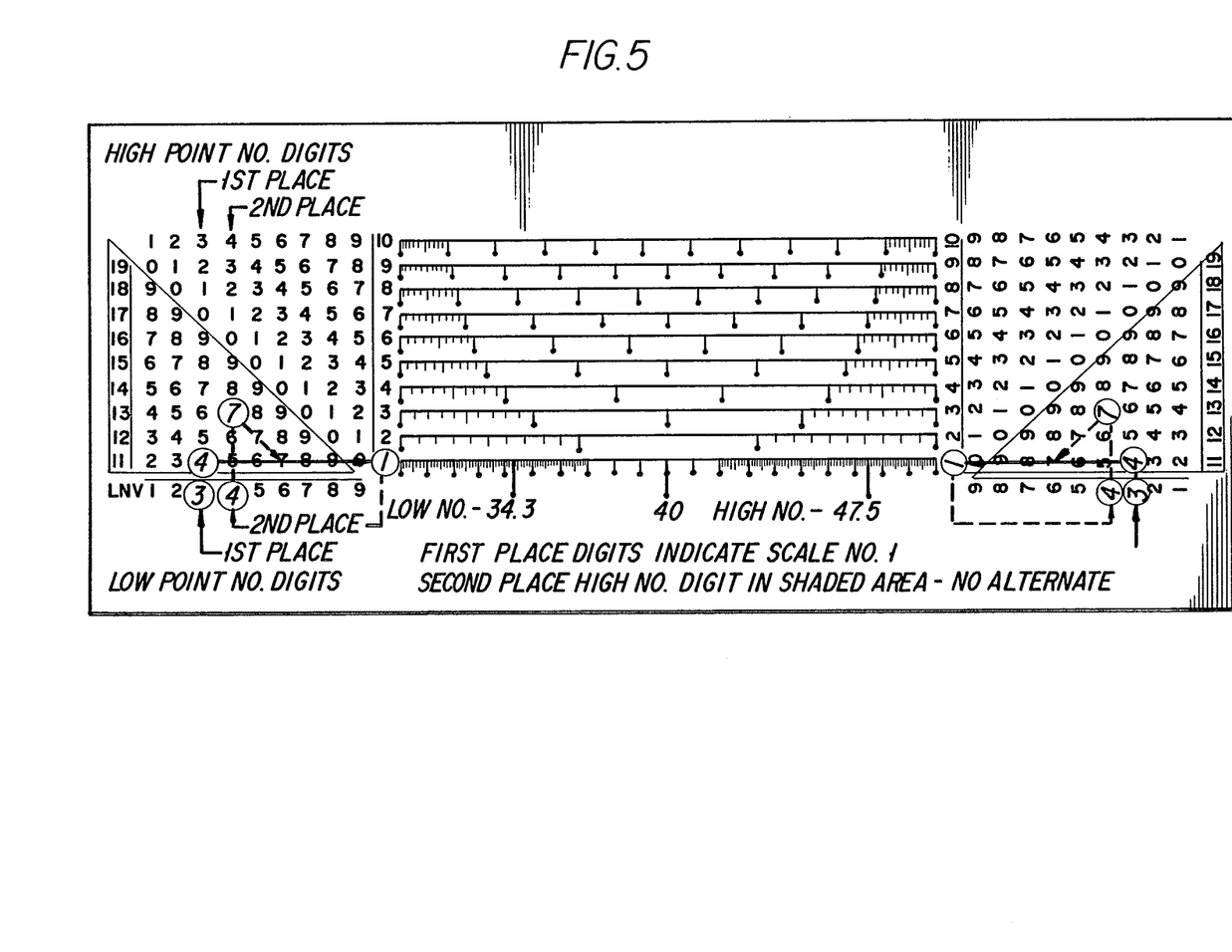

Finally, FIG. 5 illustrates a further alternative in which the first place digits indicate scale number 1 and the second place digits place the high number digit in the shaded area so that there is no alternative scale. In particular, the low point number is 34.3 while the high point number is 47.5. Consequently the first place digits which are respectively 3 and 4 indicate the first scale. The second place digits which are 4 and 7 also indicate the first scale. However the second place digit of the high number is in the shaded area of the scale. Consequently it does not represent a true alternate.

Other aspects of the invention will be apparent to those of ordinary skill in the art.

I claim:

1. A contour plotter, comprising
a scale bar having at least one scale thereon;
a first slide movable in relation to said scale bar; and
a second slide movable in relation to said scale bar;
said first slide having an arm with a reference edge; and
said second slide having a pivoted coordinator arm with a movable edge;
wherein said coordinator arm doubles back as a return leg.

2. A contour plotter as described in claim 1 wherein said first slide is used to designate two positions to be interpolated and provides a line joining the two positions and said return leg provides an hypotenuse of a triangle including said line joining two positions to be interpolated and an imaginary line parallel to said scale.

3. The contour plotter of claim 1 wherein said second slide with said coordinator arm includes a cam and said return leg is terminated at said cam.

4. The contour plotter of claim 1 wherein said scale bar includes a numerical chart at an end of said scale, with said numerical chart having a two dimensional array of scale indicators with a low number axis and a high number axis.

5. The contour plotter of claim 1 for interpolating between a low value number and a high value number and further including a plurality of scales on said scale bar, with as many scales as the number of whole number differences between said high value number and said low value number.

* * * * *